(12) United States Patent
Beckhart et al.

(10) Patent No.: US 6,526,668 B1
(45) Date of Patent: Mar. 4, 2003

(54) ELECTRONIC LEVEL

(75) Inventors: Gordon Haggott Beckhart, Colorado Springs, CO (US); Patrick Rooney Conarro, Cascade, CO (US); Kevin James Harrell, Woodland Park, CO (US); Michael Charles Krause, Colorado Springs, CO (US); Kamran Michael Farivar-Sadri, Colorado Springs, CO (US)

(73) Assignee: Microtool, Inc., Colorado Springs, CO (US)

( * ) Notice: Subject to any disclaimer, the term of this patent is extended or adjusted under 35 U.S.C. 154(b) by 0 days.

(21) Appl. No.: 09/520,595

(22) Filed: Mar. 8, 2000

Related U.S. Application Data

(60) Provisional application No. 60/124,000, filed on Mar. 11, 1999.

(51) Int. Cl.$^7$ .................................................. G01C 9/06
(52) U.S. Cl. ..................................... 33/366.11; 33/371
(58) Field of Search .................... 33/366.11, 366.12, 33/366.14, 366.15, 366.21, 366.26, 366.27, 390, 370, 371, 372, 373, 347

(56) References Cited

U.S. PATENT DOCUMENTS

| | | | | | |
|---|---|---|---|---|---|
| 1,898,367 | A | * | 2/1933 | Heinze | 33/390 |
| 2,505,166 | A | * | 4/1950 | Wood | 33/390 |
| 2,767,483 | A | * | 10/1956 | Sauer, Jr. | 33/390 |
| 3,061,920 | A | * | 11/1962 | Johnson | 33/390 |
| 3,101,554 | A | * | 8/1963 | Gottula | 33/390 |
| 3,290,786 | A | * | 12/1966 | Parkin | 33/366.12 |
| 4,694,584 | A | * | 9/1987 | Mills | 33/366.14 |
| 5,079,847 | A | * | 1/1992 | Swartz et al. | 33/366.12 |
| 5,174,034 | A | * | 12/1992 | Swanda | 33/390 |
| 5,180,986 | A | * | 1/1993 | Swartz et al. | 33/366.12 |
| 5,313,713 | A | * | 5/1994 | Heger et al. | 33/366.14 |
| 5,376,925 | A | * | 12/1994 | Crisafulli et al. | 33/366.14 |
| 5,592,745 | A | * | 1/1997 | Heger et al. | 33/366.12 |
| 5,630,280 | A | * | 5/1997 | Crossan, Jr. | 33/366.11 |
| 5,901,453 | A | * | 5/1999 | Zhang et al. | 33/366.11 |
| 6,249,984 | B1 | * | 6/2001 | Barsky et al. | 33/366.15 |

* cited by examiner

Primary Examiner—G. Bradley Bennett
(74) Attorney, Agent, or Firm—Dale B. Halling

(57) ABSTRACT

An electronic level (10) has a rigid flat disk (12). An electronic level sensor (14) is attached to the rigid flat disk (12). An electronic display (20) is electrically connected to the electronic level sensor (14).

15 Claims, 3 Drawing Sheets

ELECTRONIC LEVEL

The present application claims priority on provisional patent application No. 60/124,000 filed on Mar. 11, 1999.

FIELD OF THE INVENTION

The present invention relates generally to the field of levels and more particularly to an electronic level designed for the semiconductor industry.

BACKGROUND OF THE INVENTION

Semiconductor wafers are moved into and out of cassettes and processing stations by automated handling devices (robots) as part of the semiconductor manufacturing process. These automated tools need to be properly setup to pick up wafers and to properly return wafers to set positions. When the tools, cassettes and processing stations are not level, semiconductor wafers may be damaged, broken or scratched. This results in yield losses that can have a significant financial impact. The present method of leveling uses either an "eye-ball" approach or mechanical bubble levels. These techniques are not accurate enough and do not properly address leveling one device relative to another.

Thus there exists a need for a leveling device that overcomes these and other problems.

DETAILED DESCRIPTION OF THE DRAWINGS

An electronic level has a rigid flat disk. An electronic level sensor is attached to the rigid flat disk. An electronic display is electrically connected to the electronic level sensor. The rigid flat disk is similar in size and weight (form factor) as a semiconductor wafer. As a result, the various platforms can be leveled based on where the wafer is placed. In addition, the electronic sensor provides level resolution that is superior to mechanical bubble levels. By using the invention superior leveling can be achieved that reduces yield losses.

Figure 1:
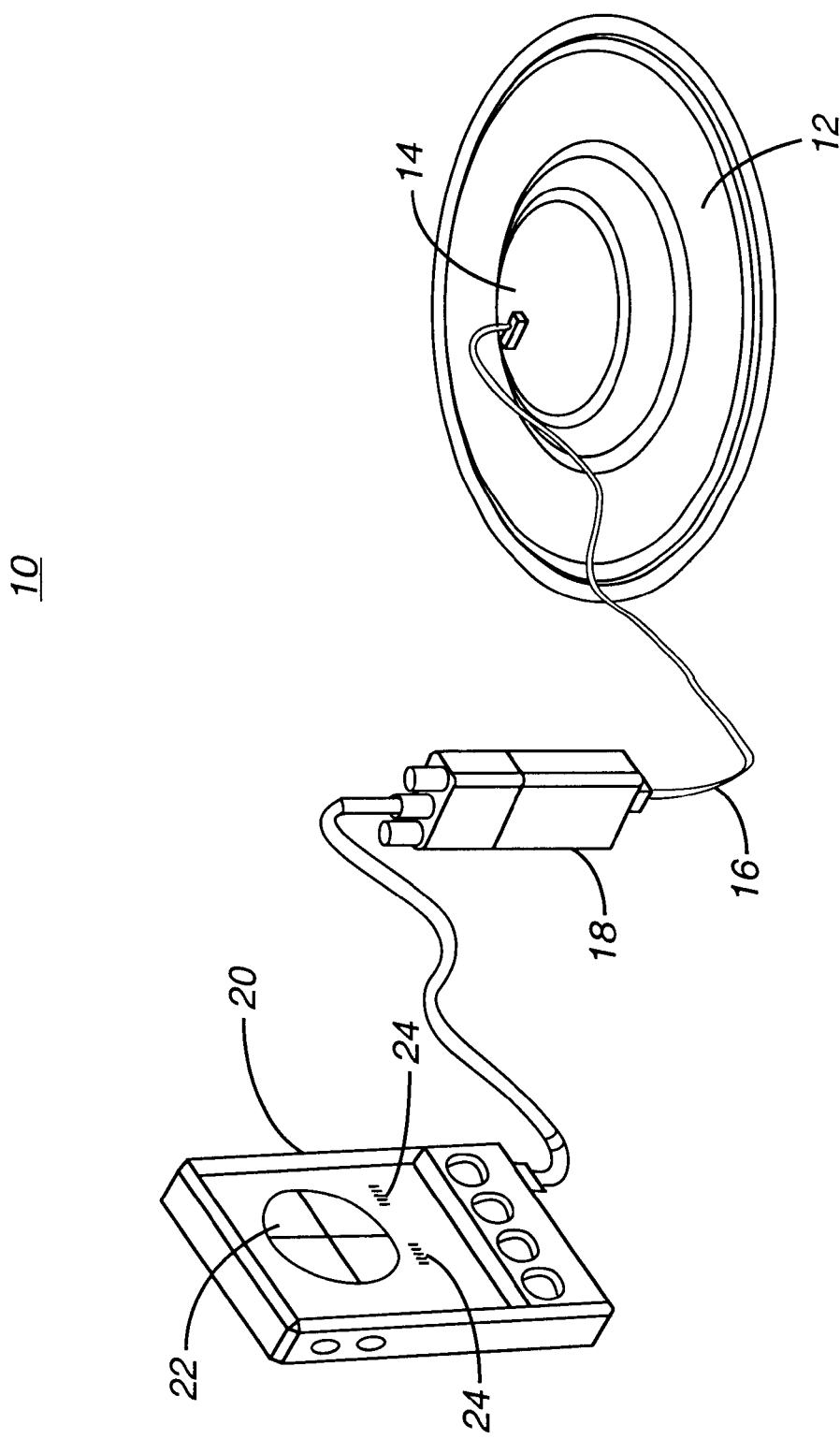
FIG. 1 is a perspective drawing of an electronic level in accordance with one embodiment of the invention.

FIG. 1 is a perspective drawing of an electronic level 10 in accordance with one embodiment of the invention. The electronic level 10 has a rigid flat disk 12. In one embodiment, the flat disk 12 does not contain the beveled edges shown in the drawing, but has a shape similar to a semiconductor wafer. The flat disk 12 is flat to within 0.076 mm across its length. An electronic level sensor 14 is attached to the rigid flat disk 12. The electronic level sensor 14 is encased by a cover. The cover protects the electronic sensor. In one embodiment, the sensor is an electrolytic bulb manufactured by Spectron. An electrical cable 16 is connected to the electronic sensor 14. An electronics box 18 in the electrical cable 16 has a battery to power the electronic sensor 14. An electronic display and processing system 20 is connected to the cable 16. The electronic display (handheld display) 20 has a graphic display 22 that is similar to a bubble level. The electronic display and processing system 20 has a processor. The display also includes a numerical pitch indicator and a numerical roll indicator 24. In one embodiment, the electronic display and processing system 20 is a Windows® CE device, such as a Compact® palm computer.

When a user turns on the electronic display and processing system 20, it sends a signal to the electronic box 18 to provide power to the electronic sensor 14. The electronic box 18 has at least one battery and control electronics that connect the battery to the electronic sensor 14. When the electronic display and processing system 20 is turned off, the electronic box disconnects the battery from the electronic sensor 14. As will be apparent to those skilled in the art, other systems could be designed to provide power to the electronic level sensor.

The electronic display and processing system 20 has an ability to calibrate the electronic level 14. The electronic level sensor 14 is glued to the flat disk 12. The flat disk 14 is then placed on a known level surface. The electronic display and processing system 20 then starts a calibration mode 21. The calibration mode sets the absolute level. In one embodiment, the processing system 20 calculates level and then the flat disk 12 is spun 180° and level is recalculated. The final level is set as an average of the two levels. The calibration mode allows a user to reset the level if for some reason the electronic level becomes misaligned.

The electronic display and processing system 20 also has a set reference mode. The set reference mode is similar to the calibration mode. In the set reference mode 23, level is set by a particular state such as a particular automated tool. This allows a user to align all the other tools and cassettes to the reference automated tool. The user can then eliminate the reference once the tools have been aligned and set a new reference for a different production line.

The user can set a damping mode. The damping mode averages the readings from the electronic level sensor. This allows the user to eliminate or reduce variations due to vibrations or other momentary disturbances. The damping mode 25 allows a user to set the amount damping which is proportional to the number of averages. In one embodiment, the damping mode uses a moving average.

The user can change the units of the pitch and roll display. In addition, the user can change the scale of the pitch and roll display. The electronic level is capable of providing a resolution of 218 micro-radians (45 seconds).

In one embodiment, the functions described above are programmed into a Windows® CE device using visual basic.

The electrical cable allows a user to see if a station is level at a remote location. This allows a user to adjust the level of a station and see its effect immediately.

Figure 2:
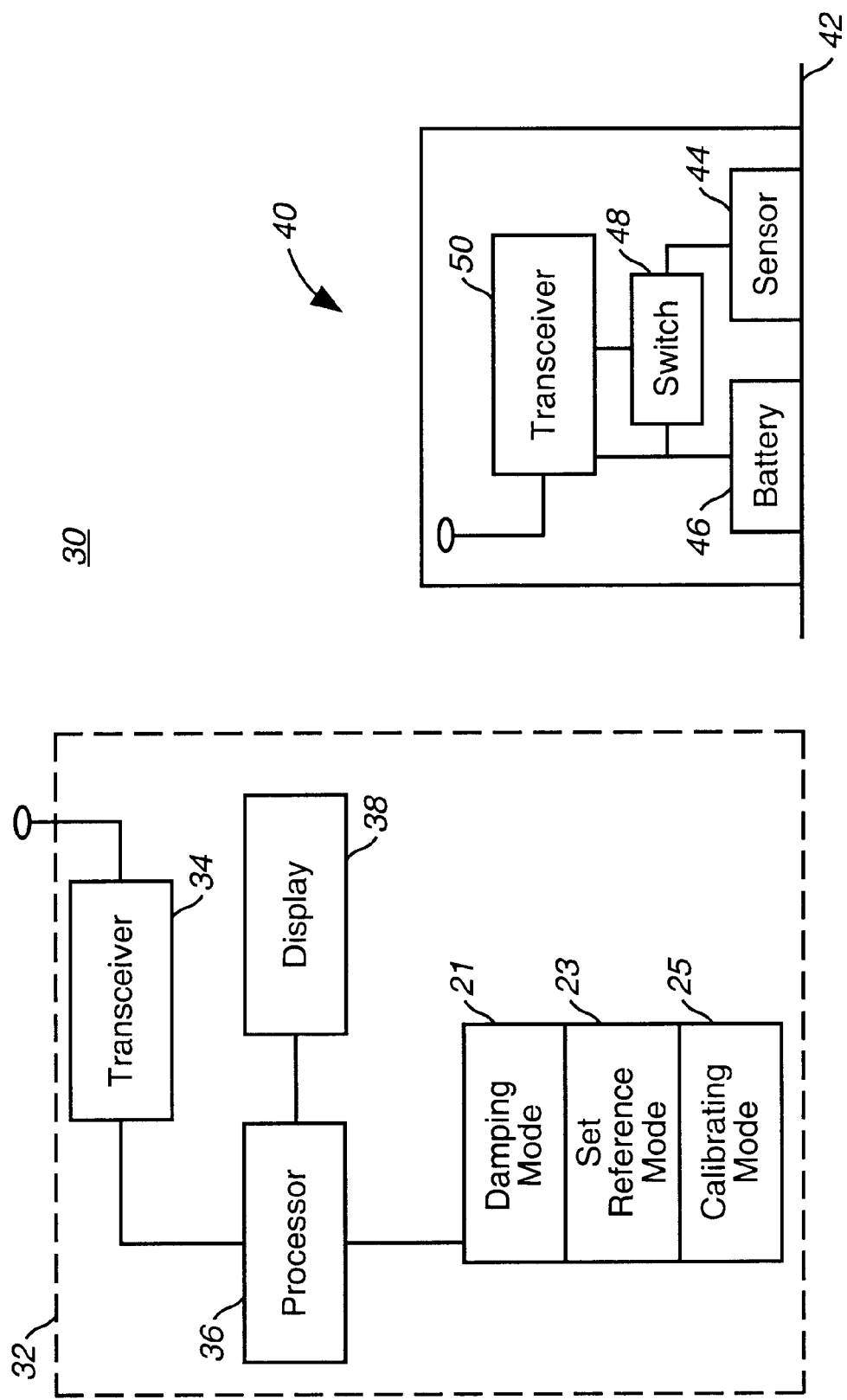
FIG. 2 is a block diagram of an electronic level in accordance with one embodiment of the invention.
Figure 3:
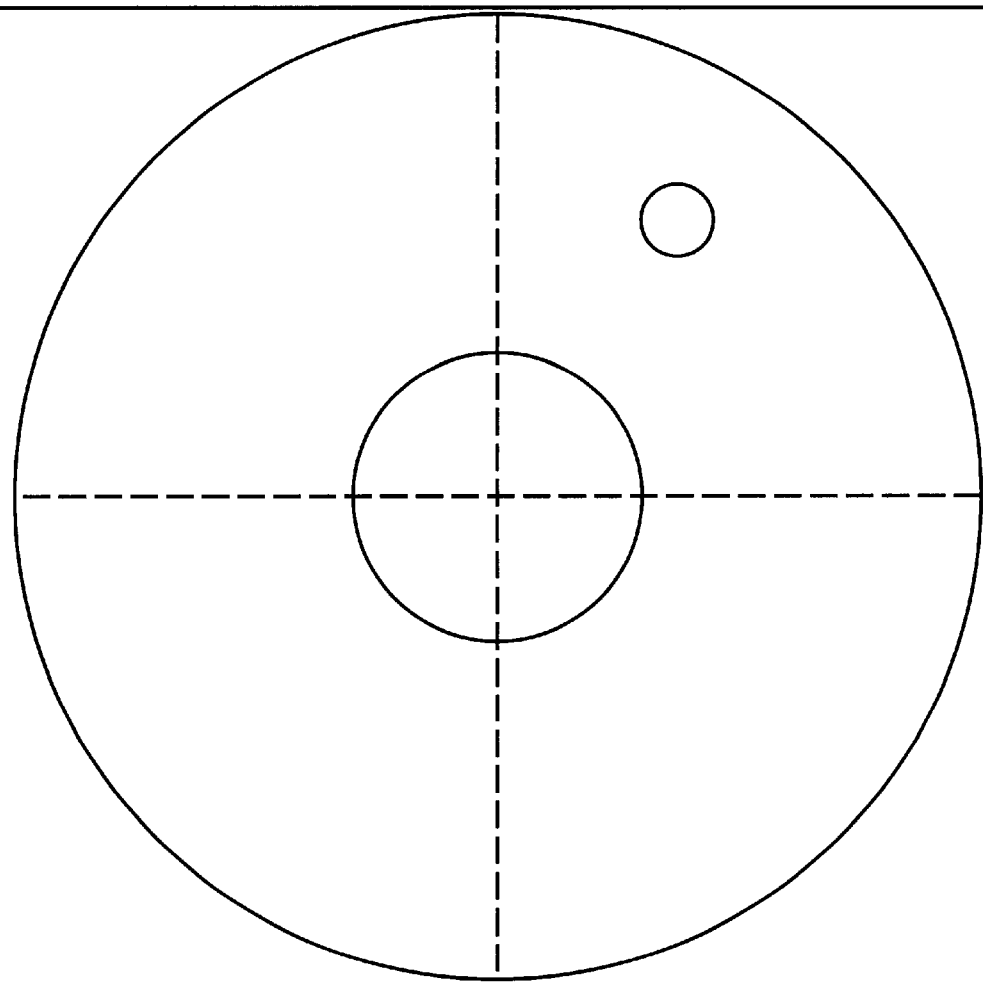
FIG. 3 is a screen shot of the handheld computer that is part of an electronic level in accordance with one embodiment of the invention.

FIG. 2 is a block diagram of an electronic level 30 in accordance with one embodiment of the invention. The electronic level 30 differs from the electronic level 10 of FIG. 1 by replacing the electrical cable with a wireless communication system. A display system 32 has a transceiver 34. The transceiver (display transceiver) 34 is connected to a processor 36. The processor 36 is connected to a display 38. A level subsystem 40 has a flat disk 42. An electronic level sensor 44 is attached to the flat disk 42. A battery 46 is connected to the sensor 44 by a controllable switch 48. A level transceiver 50 is connected to the switch 48 and in communication with the display transceiver 34. The transcever 50 receives power from the battery 46. The transceivers 34, 50 make it even easier for a user to adjust the level of a work station and see its effect. Other than the wireless feature, the electronic level of FIG. 2 works just like the electronic level of FIG. 1.

Thus there has been described an electronic level that provides a superior leveling capability. Using this tool a manufacturer can reduce the yield loss due to broken or scratched semiconductor wafers.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An electronic level comprising:

a rigid flat disk;

an electronic level sensor attached to the rigid flat disk; and an electronic display in communication with the electronic level sensor.

2. The electronic level of claim 1, wherein the electronic display is a handheld display.

3. The electronic level of claim 1, wherein the electronic display has a graphic display similar to a bubble level.

4. The electronic level of claim 1, wherein the electronic display has a pitch and a roll.

5. The electronic level of claim 1, wherein the electronic display includes a damping mode.

6. The electronic level of claim 1, wherein the electronic display has a set reference mode.

7. The electronic level of claim 1, wherein the electronic display has a calibration mode.

8. The electronic level of claim 1, wherein the rigid flat disk has a form factor like a semiconductor wafer.

9. The electronic level of claim 1, wherein the rigid flat disk has a flatness of less than 0.076 mm across its length.

10. An electronic level comprising:

a rigid flat disk;

an electronic level sensor attached to the rigid flat disk;

an electric cable having a first end connected to the electronic level sensor; and an electronic display system connected to a second end of the electric cable having a processor and a display, the display system having a graphical display similar to a bubble level and a pitch and roll display, the processor having damping routine, a reference setting routine and a calibration mode.

11. An electronic level comprising:

a flat disk having a form factor similar to a semiconductor wafer;

an electronic level sensor attached to the flat disk; and a display system in communication with the electronic level sensor.

12. The electronic level of claim 11, a level transceiver connected to the electronic level sensor.

13. The electronic level of claim 11, a display transceiver capable of communicating with the level transceiver.

14. The electronic level of claim 11, wherein the display system has a display that includes a numerical pitch indicator.

15. The electronic level of claim 14, wherein the display includes a numerical roll indicator.

* * * * *